Jan. 13, 1953 M. SADOWSKY 2,625,493
METHOD OF MANUFACTURING A REFLECTIVE FLUORESCENT SCREEN
Filed April 17, 1947 2 SHEETS—SHEET 1
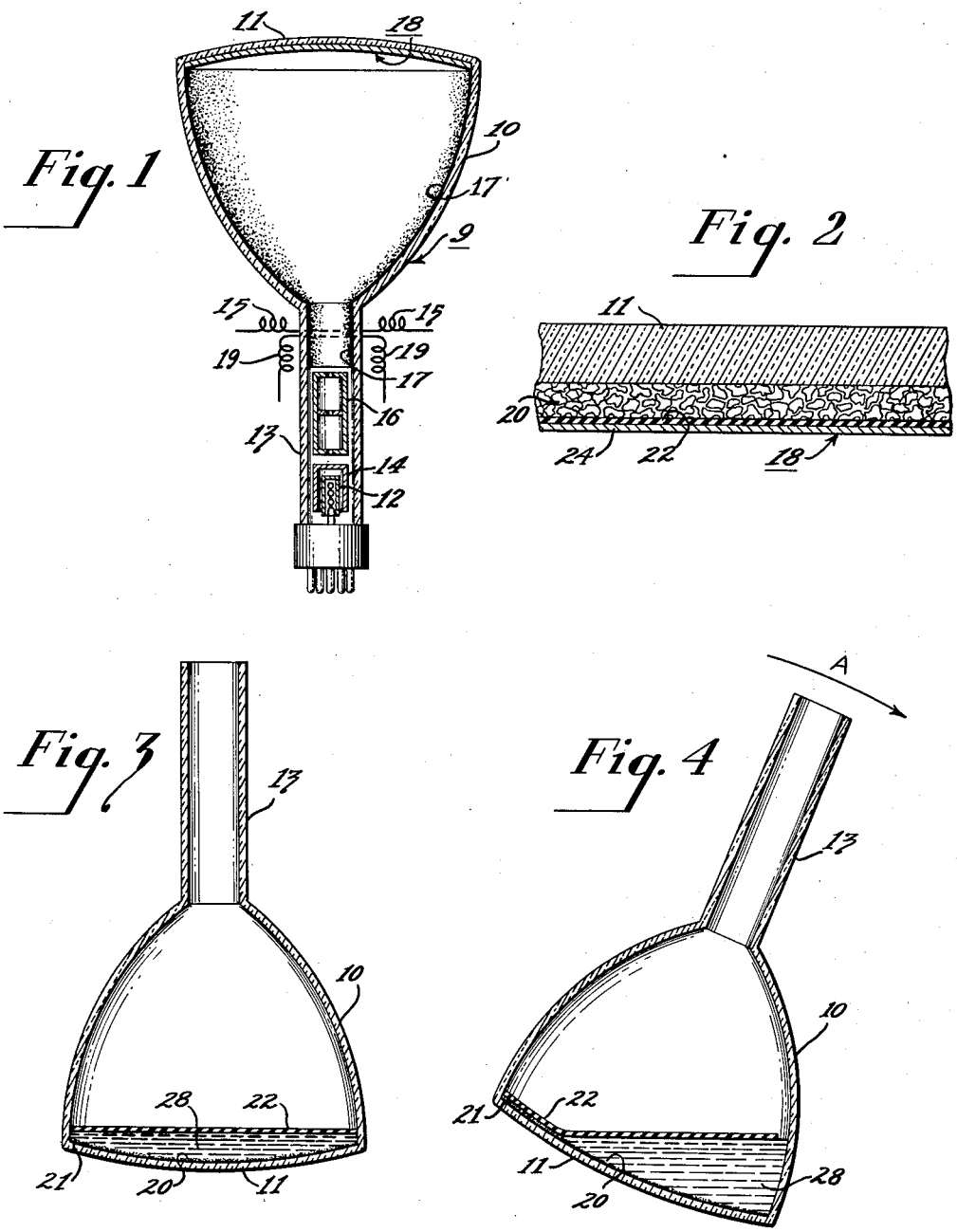
Inventor
Meier Sadowsky
By William A. Zalesak
Attorney Jan. 13, 1953 M. SADOWSKY 2,625,493
METHOD OF MANUFACTURING A REFLECTIVE FLUORESCENT SCREEN
Filed April 17, 1947 2 SHEETS—SHEET 2
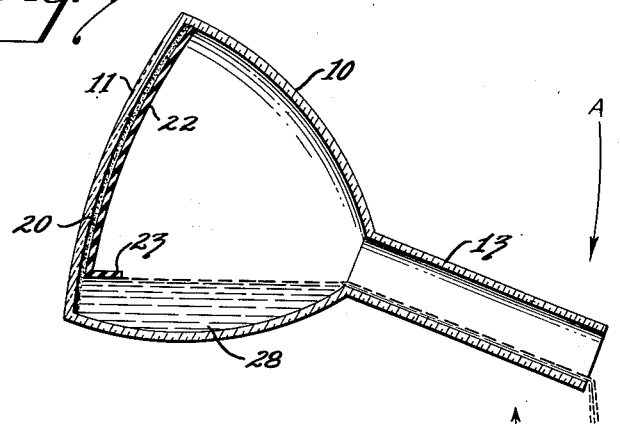
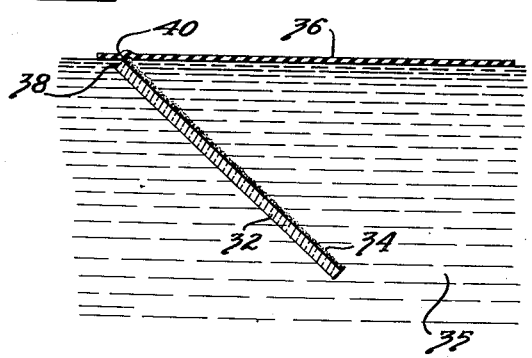
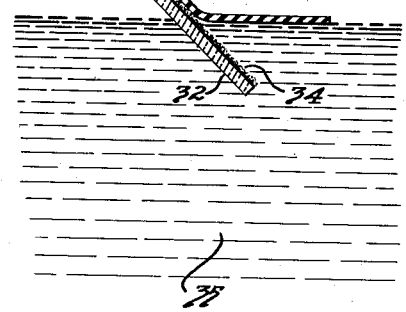
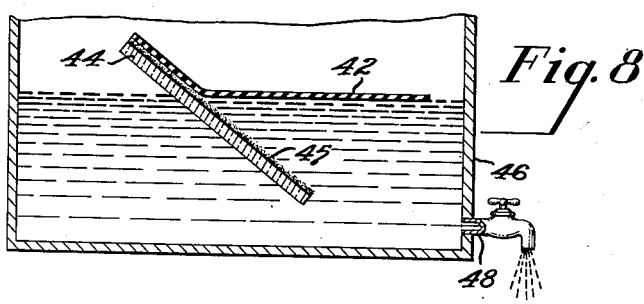
Inventor
Meier Sadowsky
By William A. Zalesak
Attorney Patented Jan. 13, 1953

2,625,493

UNITED STATES PATENT OFFICE 2,625,493

METHOD OF MANUFACTURING A REFLECTIVE FLUORESCENT SCREEN

Meier Sadowsky, Lancaster, Pa., assignor to Radio Corporation of America, a corporation of Delaware Application April 17, 1947, Serial No. 742,117

4 Claims. (Cl. 117—33.5)

My invention relates to cathode ray tubes of the type having fluorescent screens and in particular to the method of making such screens.

In certain types of cathode ray tubes using an electron beam for producing luminescence in a phosphor screen, it has proved advantageous to cover the phosphor screen inside the tube with a thin electron pervious metal screen. Such a metal screen provides a mirror surface to intensify the luminescent light of the phosphor screen. That is, light from the screen which tends to pass into the tube envelope and be lost to an observer, is reflected by the metallic film and intensifies the useful light passing through the tube face to an observer. Other advantages are also obtained by the use of metal backed phosphor screen. Light that normally goes back into the tube is not completely absorbed by the conventional black second anode coating and some of it is scattered back to the screen to light up dark areas. The metal coating prevents all light from going back into the bulb and results in an improvement in contrast. Furthermore, the metal coating absorbs the negative ion component of the scanning electron beam and prevents its destructive bombardment of the phosphor screen. Also, the function of the metal film as a conductive coating improves resolution since the electron beam does not depend on secondary emission to maintain potential at the point of focus. Also, phosphors which would not ordinarily be useful due to a poor secondary emission property can be used with a metal backing.

The metal film commonly used is an aluminum coating evaporated on top of the phosphor screen. To produce a good reflecting mirror, the surface of the aluminum film in contact with the phosphor screen should be of mirror smoothness. Due to the irregular surface presented by the phosphor crystals it is a well known practice to lay down a transparent lacquer film over the phosphor to provide a smooth foundation layer for the deposition of the aluminum coating. Many difficulties have arisen in successfully laying down the lacquer film and rather complicated procedures are involved.

It is, therefore, an object of my invention to provide an improved method for producing a metal backed phosphor screen.

It is another object of my invention to provide an improved procedure for laying down an intermediate lacquer film between the metal and phosphor layers of a cathode ray tube screen.

It is also an object of my invention to provide a mirror smooth lacquer film covering a phosphor screen for the deposition of a metal coating.

The novel features which I believe to be characteristic of my invention are set forth with particularity in the appended claims, but the invention itself will best be understood by reference to the following description taken in connection with the accompanying drawing, in which:

Fig. 1 is a view of a cathode ray tube in which my invention is incorporated;

Fig. 2 is an enlarged view of the screen of the cathode ray bulb of Fig. 1;

Figs. 3, 4, and 5 illustrate steps in the method of applying a luminescent screen to a cathode ray tube according to my invention; and Figs. 6, 7, and 8 illustrate variations in the method of applying a luminescent screen to a glass plate according to my invention.

The illustrated embodiment of my invention shown in Fig. 1 comprises a highly evacuated glass envelope 9 enclosing a cathode 12 for producing a beam of electrons. A control electrode 14 is connected to the usual biasing battery (not shown) and a first anode 16 is maintained positive with respect to the cathode 12. A second anode electrode 17 comprises a conductive coating usually of a carbon or graphite film applied to the inner surface of the bulb 10 and a portion of the neck 13 of envelope 9 as shown. This electron gun structure forms, accelerates and focuses the stream of electrons emitted by the cathode 12 into a high velocity electron beam impinging upon a screen 18 applied to the face plate 11 of the envelope 9. As is well known in the art, the beam of electrons scans the luminescent screen 18 by the application of either electromagnetic or electrostatic deflecting means. Pairs of deflecting coils for magnetic scanning of screen 18 are shown respectively at 15 and 19. The impinging electron beam excites the phosphor of screen 18 to a luminescence whose light intensity varies according to the energy of the impinging electron beam.

In Fig. 2 is shown an enlarged sectional view of the luminescent screen 18 of the cathode ray tube of Fig. 1. The luminescent screen conventionally comprises a phosphor coating 20 deposited on the inner surface of the cathode ray face plate 11. It has been found advantageous to provide a highly reflective metal coating 24 over the exposed surface of phosphor 20. This metal coating 24 is usually formed by evaporating an aluminum film upon the exposed surface of phosphor 20. The purpose of the aluminum coating 24 is to act as a mirror for the reflection of light tending to enter the bulb from the luminescent phosphor. Any light from the phosphor entering the bulb can be considered as wasted. Furthermore, light passing into the bulb is not completely absorbed by the black graphite conductive coating 17 and some of it is scattered back to the screen 18 to light up dark areas. The purpose then of the metallic coating 24 is not only to prevent the light from entering the bulb 10 but also to intensify the usual light passing through the bulb face 11. To be effective as a good mirror, the reflective surface of the metallic coating 24 should be substantially smooth so as not to scatter the reflective light to any great degree. Furthermore, the metal coating 24 should be sufficiently opaque to prevent transmission of light therethrough and yet thin enough to be pervious to the high velocity electron beam impinging upon screen 18.

It has been somewhat difficult and involved to produce a mirror smooth metallic film over the phosphor screen 20. This difficulty has arisen primarily due to the fact that in the application of the phosphor screen 20 to the face plate 11, the phosphor mainly comprises a layer of irregular odd sized crystals. This results in the exposed surface of the phosphor screen 20 being very irregular and rough. To apply the metallic coating 24 directly to this roughened exposed surface of the phosphor screen would cause the reflecting surface of the metal film 24 to conform with the irregularities of the phosphor surface. This would produce a very poor mirror, in that, light reflected from the mirror surface would be scattered in many directions as well as absorbed. It has been common practice to apply first to the irregular surface of the phosphor screen 20 a thin transparent lacquer film 22. This lacquer film 22 is supported by the irregularities of the exposed phosphor surface and presents a hardened comparatively smooth foundation layer upon which the aluminum coating 24 can be applied.

There have been several methods for the application of the lacquer film 22 which have not been too satisfactory. In Figs. 3, 4 and 5 I have disclosed a novel method for the successful application of a lacquer film to the irregular exposed surface of the phosphor 20 of the cathode ray tube of Figs. 1 and 2. As shown in Figure 3, a phosphor coating 20 is deposited in any desired conventional manner on the inner bottom surface or face plate 11 of the cathode ray bulb 10. As described above, the exposed surface of this phosphor film 20 is very irregular. To apply a lacquer film 22 to the irregular surface of the phosphor 20, I first pour sufficient water into the tube to form a pool 28 over the surface of the phosphor 20 which is maintained substantially in a horizontal position as shown in Figure 3. The amount of water used need not be excessive and should be just sufficient to cover the phosphor film 20 completely to an observable depth. A lacquer film 22 is floated upon the surface of the pool 28. The lacquer used may be of any desired resinous material or organic lacquer which can be dissolved in a volatile solvent. The application of the lacquer to the surface of the water may be done in any desired manner and is preferably applied with a pipette by which a drop or more of the lacquer can be placed upon the surface of the water pool 28. The amount of lacquer used is determined naturally by the size of the film desired. If more than one drop of lacquer is used the drops should come together and form a continuous film 22. The lacquer when dropped upon the surface of the water will spread out uniformly to form a very thin circular film on the water surface. The purpose of the water pool 28 is to float this lacquer film above the phosphor screen 20. Sufficient lacquer is used to produce a film of the desired surface area. Normally, the film 22 should be of a size equal to the surface area of the phosphor 20 to be covered. The film, after its application to the surface of the water 28, is allowed to only partially dry so that it remains sufficiently flexible and extensible for its application to the phosphor 20. The cathode ray bulb 10 with the coated bottom surface 11 is then tilted slowly about a horizontal axis until one edge 21 of the phosphor screen 20 breaks through the surface of the water and attaches itself by adherence to the corresponding edge of the film 22. The tilting of the bulb is continued as shown in Figure 4 to allow the water 28 to flow out from between the floating film 22 and the adjacent surface of the phosphor coating 20. As the water is poured out, the film adheres to the exposed surface of the phosphor 20. This procedure of tilting the bulb 10 about a horizontal axis continuously raises the exposed portion of phosphor 20 above the surface of the water 28. Film 22 attached to phosphor 20 and also adhering by attraction to the surface of the water pool 28 is stretched over the raised surface of phosphor 20 as the water pool 28 flows out between the unattached edges of film 22 and phosphor 20.

Fig. 5 shows an advanced step of this decanting process in which the water pool 28 is flowing out of the bulb neck 13. The extensible lacquer film 22 has been stretched down over the surface of phosphor 20. An unattached edge 23 of the lacquer film 22 still remains upon the surface of water 28. However, as the level of the water 28 falls the unattached portion 23 of the lacquer film will be stretched down over the remaining submerged portion of phosphor 20. After all of the water pool 28 has been poured from the cathode ray bulb 10, there is left an extensible lacquer film 22 stretched over the irregularities of the phosphor crystals. This method of applying the flexible film 22 is such that the lacquer film does not conform with the irregularities of the crystal surface of the phosphor but instead is supported as shown in Fig. 2 by the projecting portions or peaks of the irregular surface of the phosphor and is stretched therebetween to form a comparatively smooth film. After the removal of the water pool 28 the lacquer film 22 is completely dried to a hard smooth surface upon which is applied in any well known manner the aluminum film 24.

The lacquer used in forming the extensible film 22 may be of any appropriate material. A preferred substance that has been found to provide a satisfactory film, is 4½ to 5% nitrocellulose dissolved in amyl acetate together with 2½% of a commercial plasticizer and 5% camphor. One type of commercial plasticizer used, is triethylene glycol di-2-ethyl butyrate triglycol dihexoate. The purpose of the plasticizer and the camphor is to increase the elasticity of the lacquer and to decrease the rate of drying. The plasticizer can be used alone but better results have been obtained when used with camphor. It is also possible to substitute other plasticizers in different proportions or other agents to give similar results. However, the lacquer should be just sufficiently extensible to allow drainage during pouring. The plasticizers control the contraction of the film as the lacquer dries. The amount of plasticizer used should permit the film to lift off of the lowest peaks or elevated points of the phosphor surface but prevent a greater contraction of the film which would produce blistering between the lacquer and phosphor. Any other resinous material or organic lacquer which provides a similar type of extensible film may also be used.

Before the application of the resinous film 22 the cathode ray bulb is rinsed several times to remove any loose particles of the phosphor screen 20. The pool of water need only be sufficiently deep to cover the phosphor 20 to a sufficient depth to separate the film 22 on the surface of the pool from the phosphor surface 20. If the spreading of the film is limited by the hardening of the film on the advancing front, a pre-saturation of the atmosphere within bulb 10 with amyl acetate has proved advantageous. After application of the film to the surface of the water pool 28, a period of time is allowed to permit the resinous film to partially dry. The period of drying time allowed varies with the size of the tube, the amount of lacquer used and the saturation of the air within the bulb 10. In a 5 inch diameter bulb, for example, it has been found that a period of 2 minutes is sufficient to allow the lacquer film to dry to the desired amount. The film at this point should be sufficiently extensible so that it will not break or tear and will merely stretch as water pool 28 is flowed out from underneath it. The period of time necessary to reach this condition is not too critical and may easily be determined within limits by several trials. Furthermore, the decanting of the water from underneath the film 22 should not be prolonged. With the 5 inch bulb disclosed above, it has been found that a period of three minutes for decanting is sufficient. It is obvious that if the lacquer becomes too hard during this process of its application to the phosphor surface that its adherence to the phosphor will not be satisfactory, neither will it have the ability to stretch over the top of the irregular surface of the phosphor 20.

This process of applying a lacquer film to a phosphor need not be confined to a cathode ray bulb. For example, in some types of cathode ray tubes in which the fluorescent screen is applied to the face plate before the face plate is sealed to the tube bulb, it is also possible to apply a lacquer film in a method similar to that described above. For example, in Figs. 6 and 7 a face plate 32 with its phosphor coating 34 deposited on one face thereof is submerged in a body of water 35. A lacquer film 36 is floated upon the surface of the water and allowed to partially dry. Then the face plate 32 is brought to the surface of the water in a manner such that one edge 38 will break the surface at 40 and contact a corresponding edge of the lacquer film 36. Plate 32 is then brought slowly out of the water such that its adjacent surface is always at an angle to the surface of the water, as shown, and so that the water between plate 32 and film 36 will flow out between the unattached edges of the film and plate. Thus, as plate 32 is raised from the water pool 35, film 36 will be floated onto the phosphor 34 and stretched over its irregular surface. The lacquer film 36 is then completely dried to form a hard flat foundation surface for depositing thereon an aluminum film.

Another method is shown in Fig. 8 for floating a partially dried lacquer film on a phosphor surface. A fluorescent screen 45 is coated over one surface of a face plate 44 for a cathode ray tube. The face plate 44 is first submerged into a body of water held within a container 46. A lacquer film 42 is floated on the surface of the water in container 46 in a manner described above. The face plate 44 is brought to the surface of the water with the phosphor coating adjacent to the lacquer film 42. The surface of the phosphor film 45 on one face of plate 44 is maintained at an angle to the surface of the water. Either one edge of the plate may be brought above the surface of the water so as to attach itself to a corresponding edge of the lacquer film 42 in a manner described in Figs. 6 and 7 or the surface of the water in the container 46 may be lowered until the upper edge of plate 44 breaks through the surface and makes an attachment with a corresponding edge of the lacquer film 42. After the lacquer film 42, however, has been attached to one edge of the phosphor screen 45, the inclined position of the glass plate 44 is maintained while the surface of the water in container 46 is lowered. The water between the mutually unattached portions of the lacquer film 42 and the phosphor screen 45 is removed by permitting it to flow through an outlet 48 at the bottom of the container. In this way the water flowing out from between the lacquer film 42 and the face plate 44 will stretch the film 42 over the irregularities of the phosphor 45. After the application of the film 42 to the surface of the phosphor 45 has been completed, the lacquer coated phosphor screen is completely dried until the lacquer becomes a hard smooth surface. After this the face plate 44 is ready for the application of an aluminum film by any method desired.

It is not necessary to confine any of the above processes to the use of a water pool as in most cases any liquid can be used which is not a solvent for the lacquer and upon which the lacquer film will flow.

While certain specific embodiments have been illustrated and described, it will be understood that various changes and modifications may be made therein without departing from the spirit and scope of the invention.

What I claim as new is:

1. The method of producing a reflective fluorescent screen on a surface of a cathode ray bulb, the method comprising the steps of, applying to the bulb surface a phosphor coating, covering the phosphor coating with a volatile liquid pool, floating onto the surface of the liquid pool above said phosphor screen a film of lacquer dissolved in a volatile solvent immiscible in said liquid, partially drying the lacquer film to an extensible consistency by evaporation of its solvent, tilting the bulb portion about a horizontal axis to bring one edge of the phosphor screen in adherence with the extensible film, continuing the tilting of the bulb portion in the same direction to gradually bring the remainder of the phosphor screen to the surface of the liquid pool, flowing the liquid out from between the phosphor screen and the lacquer film to spread the lacquer film from its attached edge over the phosphor surface, and then completely drying the lacquer film to a hard surface.

2. The method of applying a reflective metal film to a phosphor screen adhering to a portion of a cathode ray bulb, the method comprising the steps of, covering with a pool of water the phosphor screen while substantially horizontal, forming on the surface of the water above said phosphor screen a floating film of lacquer dissolved in a volatile solvent immiscible in water, partially drying the lacquer film to an extensible consistency by evaporation of its solvent, tilting the bulb portion about a horizontal axis to bring one edge of the phosphor screen in adherence with the extensible film, continuing the tilting of the bulb portion in the same direction to gradually bring the remainder of the phosphor screen to the surface of the water, flowing the water out from between the phosphor screen and the lacquer film to stretch the lacquer film from its attached edge over the phosphor surface, completely drying the lacquer film to a hard surface, and applying a reflective metal film to said lacquer surface.

3. The method of producing a reflective luminescent screen on the inside face of a cathode ray bulb, the method comprising the steps of, applying to the inner bulb face a phosphor coating, covering the phosphor coating with a pool of water, forming on the surface of the water above said phosphor coating a floating transparent film of nitrocellulose dissolved in amyl acetate sufficient to cover a surface area equal to that of the phosphor coating, partially drying the nitrocellulose film to an extensible consistency by evaporation, tilting the bulb about a horizontal axis to bring one edge of the phosphor coating into adherence with a corresponding edge of the nitrocellulose film, continuing the tilting of the bulb in the same direction to decant the water from between the phosphor coating and the extensible nitrocellulose film to stretch the film over the phosphor surface, drying the stretched film to a hard smooth surface, applying a reflective coating to the surface of the hardened nitrocellulose film by evaporating aluminum in vacuum.

4. The method of producing a reflective luminescent screen on an inner bottom surface of a cathode ray bulb, said bottom surface being disposed in a substantially horizontal position, the method comprising the steps of, applying to said bottom bulb surface a phosphor screen coating, covering the phosphor coating with a volatile liquid pool maintaining said bottom bulb surface in said substantially horizontal position, forming on the surface of the liquid pool above said phosphor screen a floating film of lacquer dissolved in a volatile solvent immiscible in said liquid, partially drying the lacquer film to an extensible consistency by evaporation of its solvent, tilting said bottom bulb surface about a horizontal axis to bring one edge of the phosphor screen in adherence with the extensible film, continuing the tilting of said bottom bulb surface in the same direction to gradually bring the remainder of the phosphor screen to the surface of the liquid pool and thereby flowing the liquid out from between the phosphor screen and the extensible lacquer film and stretching the lacquer film from its attached edge over the phosphor surface, drying the lacquer film, and applying a reflective metal coating to the exposed surface of the lacquer film.

MEIER SADOWSKY.

REFERENCES CITED

The following references are of record in the file of this patent:

UNITED STATES PATENTS

| Number | Name | Date |
|---|---|---|
| 304,802 | Dewar | Sept. 9, 1884 |
| 618,672 | Henry | Jan. 31, 1899 |
| 1,532,782 | Sheppard et al. | Apr. 7, 1925 |
| 2,223,830 | Leverenz | Dec. 3, 1940 |
| 2,374,311 | Schaefer | Apr. 24, 1945 |